(12) United States Patent
Waldbusser

(10) Patent No.: US 11,258,653 B1
(45) Date of Patent: Feb. 22, 2022

(54) MONITORING GATEWAY SYSTEMS AND METHODS FOR OPENFLOW TYPE NETWORKS

(71) Applicant: Steven Waldbusser, Los Altos, CA (US)

(72) Inventor: Steven Waldbusser, Los Altos, CA (US)

( * ) Notice: Subject to any disclaimer, the term of this patent is extended or adjusted under 35 U.S.C. 154(b) by 0 days.

(21) Appl. No.: 16/571,602

(22) Filed: Sep. 16, 2019

Related U.S. Application Data

(63) Continuation-in-part of application No. 15/401,622, filed on Jan. 9, 2017, now Pat. No. 10,419,319, which is a continuation of application No. 14/626,861, filed on Feb. 19, 2015, now Pat. No. 9,544,182.

(60) Provisional application No. 62/118,433, filed on Feb. 19, 2015, provisional application No. 61/942,000, filed on Feb. 19, 2014.

(51) Int. Cl.
*H04L 12/24* (2006.01)
*H04L 41/0213* (2022.01)
*H04L 43/0817* (2022.01)

(52) U.S. Cl.
CPC ...... *H04L 41/0213* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 6,137,801 A * | 10/2000 | Anderson | H04L 41/042 370/377 |
| 7,339,913 B2 | 3/2008 | Chou et al. | |
| 8,180,846 B1 * | 5/2012 | Zur | G06F 11/3034 709/217 |
| 9,258,132 B2 | 2/2016 | Vieira | |
| 2005/0080886 A1 | 4/2005 | Croy et al. | |
| 2006/0026301 A1 | 2/2006 | Maeda et al. | |

(Continued)

OTHER PUBLICATIONS

Levi, David, et al., "SNMPv3 Applications", Jan. 1998, https://tools.ietf.org/html/rfc2273, Entire Document.

(Continued)

*Primary Examiner* — Anh Ngoc M Nguyen
(74) *Attorney, Agent, or Firm* — Stephen E. Zweig

(57) ABSTRACT

A network management gateway device, method, and software is disclosed which communicates and translates between more sophisticated digital data network monitoring devices and managers, such as SNMP managers, and managed network devices, such as OpenFlow packet switches, which often are not sophisticated enough to respond to SNMP or REST type monitoring methods. This gateway may communicate with managed devices in one or more of a variety of modes. The manager may communicate with the gateway directly, or be configured to communicate with the managed device while the communications are redirected to the gateway and processed by the gateway. In some embodiments, the gateway may use the OpenFlow protocol to communicate management data with an OpenFlow switch and to install a flow in the switch to redirect management traffic to the gateway. Other routers and switches may also be used to redirect network management traffic to the gateway as well.

20 Claims, 10 Drawing Sheets

(56) References Cited

U.S. PATENT DOCUMENTS

| | | | |
|---|---|---|---|
| 2007/0201508 A1 | 8/2007 | Blackford et al. | |
| 2009/0300180 A1* | 12/2009 | Dehaan | H04L 63/0823 709/225 |
| 2010/0077395 A1* | 3/2010 | Edwards | H04L 12/66 718/1 |
| 2012/0011236 A1* | 1/2012 | Hyoudou | G06F 9/4416 709/222 |
| 2014/0016459 A1* | 1/2014 | Ogata | H04L 47/19 370/230 |
| 2014/0362709 A1* | 12/2014 | Kashyap | H04L 43/04 370/250 |

OTHER PUBLICATIONS

Unknown Author, "SNMP Gateway | SNMP Converter | SNMP Conversion", Jan. 13, 2013, https://web.archive.org/web/20130113145401/http://www.protoconvert.com/GatewayBridge/BuildingAutomationGateway/SNMPGateway.aspx, Entire Document.

Unknown Author, "Snmpd proxy—Net-SNMP Wiki", Dec. 6, 2012, https://web.archive.org/web/20121206234353/http://net-snmp.sourceforge.net/wiki/index.php/Snmpd_proxy, Entire Document.

Unknown Author, "SNMP Research—Proxy Information", Oct. 5, 2013, https://web.archive.org/web/20131005094642/http://snmp.com/protocol/proxyinfo.shtml, Entire Document.

* cited by examiner

Figure 5

| Ethernet Src | Ethernet Dst | Ethernet Proto | IP Src | IP Dst | IP Protocol | Dst Port | ... | Action |
|---|---|---|---|---|---|---|---|---|
| * | * | IP | * | Switch IP | UDP | 161 | * | Controller |
| * | * | IP | * | Switch IP | TCP | 80 | * | Controller |

MONITORING GATEWAY SYSTEMS AND METHODS FOR OPENFLOW TYPE NETWORKS

CROSS REFERENCE TO RELATED APPLICATIONS

This application is a continuation in part of U.S. patent application Ser. No. 15/401,622, filed Jan. 9, 2017, inventor Steven Waldbusser; application Ser. No. 15/401,622 was a continuation of application Ser. No. 14/626,861, filed Feb. 19, 2015, inventor Steven Waldbusser, now U.S. Pat. No. 9,544,182; application Ser. No. 14/626,861 claimed the priority benefit of U.S. provisional patent application 61/942,000, inventor Steve Waldbusser, filed Feb. 19, 2014; application Ser. No. 14/626,861 also claimed the priority benefit of U.S. provisional patent application 62/118,433, inventor Steven Waldbusser, filed Feb. 19, 2015; the entire contents of all these applications are incorporated herein by reference.

BACKGROUND OF THE INVENTION

Field of the Invention

This invention is in the field of communications network management methods and devices.

Description of the Related Art

Modern, packet-based digital, communications networks are typically large, complex and geographically distributed. Such networks need to be monitored and managed. To do this, typically network management equipment and protocols are used which enable remote observation and control of the various types of other equipment (e.g. computers, servers, routers, and switches) that may both make up the network or are attached to the network. Other network virtual assets such as applications, virtual machines, and virtual switches, also need to be monitored and managed.

These monitoring and management equipment and protocols are typically used for various applications such as to find or prevent network faults, understand or change network configuration, account for network usage, understand and ensure high network performance, and to ensure network security. In particular, Network Management Systems (NMS's) are usually the focal point of remote monitoring and management of these various physical and virtual network elements.

One problem that exists in such networks is that often a given managed element, such as a packet switch, or even a more complex device such as a server, may not be compatible with the network management protocols that a NMS wishes to use or that the features supported by the element may be insufficient for the NMS's task. This problem is particularly acute with OpenFlow switches, which to achieve speed have very limited computational capability, and thus may either not support popular network management protocols such as SNMP at all, or alternatively may only provide limited access to switch data through SNMP or related higher level network management protocols.

As mentioned above, implementing various types of standard network management protocols with devices like OpenFlow switches is particularly difficult. Such switches may have very high switching capacity (e.g. can often handle and process incoming network packets at the very high speeds or line rates, thus generally avoiding being a network bottleneck). Such switches achieve such high speeds due to their specialized electronic circuitry, but the design tradeoff is that they have a relatively small supervisory processor to handle management tasks like NMS requests, configuration tasks and control plane activity.

OpenFlow switches are described in McKeown et. al., "*OpenFlow: Enabling Innovation In Campus Networks*", *ACM SIGCOMM Computer Communication Review archive Volume* 38 *Issue* 2, *April* 2008 *Pages* 69-74. As of Oct. 14, 2013, *OpenFlow Switch Specification* 1.4.0, provided by the Open Networking Foundation, defines the specification more precisely as of this date. Other work in this area includes Leong, US patent publication 2013/0272135; and Kawai, US patent publication 2013/0304915.

More specifically, in OpenFlow switches, for example, a main goal of the switch is to perform packet switching at the same line-speed as the incoming data packets, which will often be coming in at very high speeds. To do this, for OpenFlow devices, the design decision was made that to achieve such high speeds the actual "intelligence" of the switch is greatly limited. The switch, for example, can be viewed (in a very oversimplified manner) as comprising a flow-table type design that mainly comprises enough hardware functionality to compare the packet headers of incoming packets against a series of previously stored flow table entries, and to dispatch an incoming packet to an outward bound port depending on the corresponding flow-table instructions stored in the corresponding flow-table instructions for that particular flow-table entry. An OpenFlow switch can also do a few other functions, such as recognize exception packets and forward them on to an OpenFlow controller for further analysis and action, at a huge time penalty, but the point is that for this type of device, in order to achieve high speed, the intelligence of the device, such as intelligence useful to perform network diagnosis and monitoring, is greatly limited.

Another problem that often exists with higher functionality network managed elements, such as routers and servers, is that even if that element's processing capability is, in theory, sophisticated enough to support network management protocols such as SNMP requests at a low speed or low volume, in practice such devices may not have enough processing capacity to handle a higher volume of network management requests from one or more NMS's, while still performing their routine functions in a timely manner. That is, such devices may have to make an unhappy decision between either performing their basic network function, or responding to network monitoring requests, but can't do both functions well at the same time.

Further, in this and other situations, often the processor of a networked element may have other constraints, such as a fixed speed that cannot be scaled up if conditions warrant.

Another problem that exists in the current state of the art is that many switches and servers exist in a multi-tenant datacenter environment where they are shared by customers who each demand privacy. In order to provide customers with access to network management, the network management protocol must provide robust authentication, access control and privacy, which may be too expensive to provide on a network switch especially with multiple customers accessing the data simultaneously. Further, the data may need to be converted from a physical view to a virtual view that matches the customer's network service and this conversion might need the services of a general-purpose server and higher level customer data. Finally, security and stability requirements may dictate some separation between the customer's network management requests and the physical infrastructure.

In the past, workers in the field have tried to solve protocol translation, scalability and security problems in network management through the use of proxy agents or gateways. Such solutions sometimes solved the original problems but achieved limited adoption because they added complexity. In particular, it imposed a significant computational and management burden on network managers to have to remember and use a different network address for their network management requests that were other than the "real" address of the device that they would use for other functions. Further, if a proxy agent provided access to multiple managed devices, little-used and complex facilities like contexts and communities would have to be used to identify the managed device. Further still, critical auto-discovery and auto-configuration processes designed to learn of the existence and configuration of network elements could not perform these tasks in the presence of proxy agents, leaving important parts of the infrastructure unmanaged.

OpenFlow is an architecture that allows OpenFlow switch controllers to remotely control OpenFlow flow-table driven switches. The OpenFlow architecture does not provide a way for Network Management Systems, which primarily use SNMP, to monitor and manage the OpenFlow switches with SNMP. Further, it does not provide visibility into a number of pieces of information that managers need in order to efficiently manage OpenFlow networks.

Virtual services (including virtual switches) on virtual machines may be started or stopped or be moved to other physical locations, possibly requiring changed in addressing. It can be difficult to manage such a service directly when such virtual services, switches, or other machine's address is changing or when it is intermittently reachable.

Network elements are often monitored by polling techniques, in which the status of the network element is assessed whenever the network monitoring equipment issues a poll request. However the problem with such approaches is such polling methods can thus omit important information about conditions or events that have occurred between polls. Further, there may be important information a given network element doesn't return via polling.

Thus, again returning to our OpenFlow example, when one attempts to use polling methods to monitor an OpenFlow switch using the prior-art OpenFlow Protocol—critical resource shortfalls in between polls may not be noted. Indeed in this situation, there is a lot of other useful and important network monitoring information about the switch's interaction with its controller that also cannot be obtained using such prior-art approaches.

BRIEF SUMMARY OF THE INVENTION

In its various embodiments the present invention provides a network management gateway that can accomplish one or more of the following objects and advantages:

To provide access to network monitoring information by using or translating between one or more communications and network management/monitoring protocols.

To provide protection of managed devices from excessive CPU and memory demands of network management requests while allowing those requests to be processed efficiently by a general purpose computer or virtual machine(s).

To provide separation of secure equipment from customer's network management requests and the ability to handle those requests with robust authentication, access control and privacy.

To provide virtualized management software that is as simple to understand and use as its traditional counterparts because it doesn't require any addressing changes.

To provide a rich set of information that helps operations staffs manage OpenFlow networks.

To provide virtualized management software that provides many features that normally would only be available if it were running on the managed equipment.

To provide fast and efficient communications to virtualized services by utilizing the fast data plane of networked equipment.

In some embodiments, the invention may be a system or method of monitoring a status of a network configured to forward digital communications network packets.

By way of background, the network and packets will be described in more detail. Here each network packet can be viewed (in a simplified manner) as comprising a packet header and packet payload, and the network itself can be viewed as comprising a plurality of fast limited-intelligence switches and controllers, such as flow-table controlled switches, switch controllers, along with at least one manager device which need not have limited intelligence. In some embodiments, these flow-table controlled switches and controllers may be OpenFlow switches or controllers or alternative types of flow-table controlled switches and controllers. In general, however the inventions disclosed herein can function with a wide variety of other types of limited-intelligence or limited onboard processing capability switches and controllers as well.

Using flow-table controlled switches as a particular embodiment in this case, these flow-table controlled switches will typically comprise a flow-table controlled packet forwarding switch with a plurality of ports, as well as a unique network switch address that the switch electronics are capable of recognizing. These switches are typically configured to perform network packet forwarding by a process of automatically comparing the packet header of incoming packets to the switch's flow-table packet header filters. If the switch's circuits detect that a match is found, the switch circuits are configured to automatically process this packet according to corresponding flow-table instructions. However if a match is not found, the switch circuits are configured to designate this packet as an exception packet, and the switch circuit's then automatically forward this nonconforming packet to a switch controller according to the corresponding flow-table packet "non-matching" instructions. In this respect, this particular switch can be said to be acting as a "forwarding switch".

Here each switch controller will generally comprise a processor (e.g. a more sophisticated processor in the computational sense, often capable of running a more complete instruction set such as a MIPS, ARM, x86, PowerPC, or other type instruction set) as well as software configured to receive these exception packets, and determine an action based on at least the headers of these exception packets. The switch controller will typically then transmit back to the particular switch that sent the exception packet originally (e.g. the "forwarding switch"), suitable flow-table configuration commands that, for example, can update that particular forwarding switch's flow-table filters and corresponding forwarding instructions. The update commands will allow that forwarding switch to subsequently recognize the header of the original exception packet and to forward the original exception packet (and subsequent similar type packets with the same characteristics) according to these updated forwarding instructions.

In one embodiment, the invention itself operates by providing at least one monitoring gateway (often referred to as simply a "gateway) comprising a processor (e.g. often itself a more sophisticated processor in the computational sense, often capable of running a more complete instruction set such as a MIPS, ARM, x86, PowerPC, or other type instruction set), memory, and software. As will be discussed, the invention comprises any of, the gateway devices itself, method of operating the gateway, and also the software used to run the gateway electronics.

Here each gateway will preferably also have a unique network gateway address that is recognized by the gateway electronics. The gateway is configured to repeatedly receive monitoring data of a plurality of the previously described switches, and to store at least some information pertaining to the monitoring data in the gateway's memory.

As will be described in more detail herein, each monitoring gateway is generally further configured to recognize at least some network monitoring commands (e.g. SNMP requests/commands, REST/XML requests/commands, REST/JSON requests/commands, and the like). The gateway will use its previously stored "some information" from its memory to respond to these network monitoring. Typically, these responses will be responses that return information related to the status of the network, as per that particular network monitoring request/command. Typically, each monitoring gateway is configured to respond to network information requests from at least one manager device (e.g. an SNMP manager) and to transmit response information related to the status of the network to this at least one manager device. These network status requests/commands and responses to and from manager devices can flow to and from the switch and the monitoring gateway according to various paths, which will be discussed in more detail shortly.

BRIEF DESCRIPTION OF THE DRAWINGS

FIG. 5 shows the fields of an example flow that could be used when the management traffic is SNMP type communications.

DETAILED DESCRIPTION OF THE INVENTION

Nomenclature: in this disclosure, as well as in the disclosures of provisional application 61/942,000, the entire contents of which are incorporated herein by reference, the term "agent" is occasionally used. Depending upon context, the term "agent" may refer to network management software (e.g. SNMP, REST/JSON) often used to control a managed device. In other contexts, the term "agent" can refer to a "managed element" or "managed device" such as a switch. In practice, the managed devices will often be hardware that is controlled by the agent software, so the distinction is not always important.

Note however that even where the term "managed device" is used, this use is not intended to be limiting. In the broader context, "managed device" can be viewed as also referring to software (e.g. non-transitory computer readable medium including program instructions for execution by one or more processors) which may be implemented in the form of virtual entities implemented by software executing on various types of processors; such as software programs, software applications, software servers, services and virtual machines. Similarly, although the term switch "switch" finds many physical examples (e.g. the hardware used to implement OpenFlow network packet switches), this use is not intended to be limited to a specific type of network packet switch, and indeed other physical devices, or virtual entities (which of course ultimately run on physical devices such as cloud servers) can also be considered to be switches as well.

Figure 1:
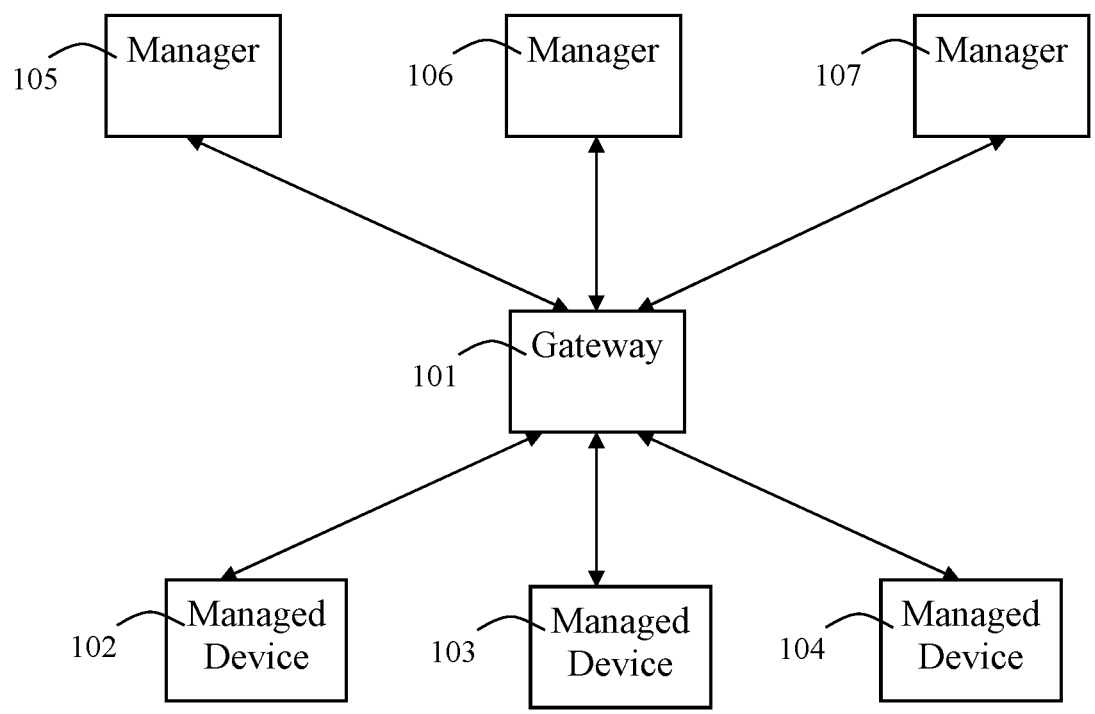
FIG. 1 shows the invention's monitoring gateway in a network environment communicating with one or more managers (e.g. SNMP manager devices) and one or more managed devices (e.g. OpenFlow switches).

As previously discussed, modern digital communications networks are built with networked computing equipment including switches, routers, servers and general purpose computers as well as virtual assets such as applications, virtual machines, and virtual switches. These elements in these networks may be managed using various types of management protocols such as SNMP and Netconf and also by other (typically non-management) protocols such as SSH, HTTP, and the like. These protocols are used to transfer data to and from the managed elements to accomplish goals including those relating to fault, configuration, accounting, performance, and security. Any network element that transfers data to manage one or more network elements are referred to in FIG. 1 below as managers (e.g. 105, 106, and 107) and entities to be managed referred to below as managed devices or managed elements (e.g. 102, 103, 104). Often these managed devices are switches, and in such cases, the alternative term "switch" may also be used.

The invention's monitoring gateways (e.g. 101) may be viewed as being a system that provides at least monitoring services by acting as a manager for one or more managed devices (e.g. 102) (such as switches, which often may lack sufficient computational capability to respond to certain types of network monitoring requests) and transfers data related to those managed devices (switches) to and from other managers (e.g. 105) (typically prior art managers such as SNMP managers) who wish to manage those managed devices.

As previously discussed, in some embodiments the invention may be a method, gateway, or software for a gateway for providing at least one monitoring gateway comprising a processor, memory, and software. As previously discussed, these monitoring gateways will have a unique network gateway address, and will be configured to repeatedly receive monitoring data from a plurality of the previously discussed switches (or other type managed device), and to store at least some information pertaining to this monitoring data in the gateway's memory. These monitoring gateways will typically be further configured to recognize at least some network monitoring commands, and to use this information to respond to these network monitoring commands with responses that return information related to the status of the network. Each monitoring gateway (gateway) will typically also be further configured to respond to network information requests from at least one manager device (such as an SNMP manager) and to transmit response information related to the status of the network to this at least one manager device.

Many such prior art manager devices are SNMP manager devices. Although many of the specific examples and embodiments discussed in this disclosure thus use various SNMP manager devices and various specific types SNMP requests (e.g. some or all of the various SNMP requests and responses may be implemented) as specific examples of the invention, these specific examples are not intended to be limiting.

Although, in the case of SNMP, an ability to work with the complete set of SNMP commands is obviously desirable, as a specific example of how the invention can operate, we will focus on how the invention can handle some of the more tricky SNMP commands. Thus in these examples, the previously discussed network monitoring commands can comprise at least the SNMP GetRequest or GetNextRequest network monitoring commands. However of course it will often be desirable to have the gateway respond to a full set of SNMP requests/commands. Thus discussion of specific SNMP requests and commands is not intended to be limiting.

In this example, which we will focus on in some detail, the responses that return information related to the status of the network are of course SNMP responses, and the previously discussed at least one manager device is at least one SNMP manager device. Thus in this example the network information requests comprise at least one SNMP GetRequest or GetNextRequest requests from at least one SNMP manager device. Further, the at least one monitoring gateway is configured to respond to-SNMP GetRequest or GetNextRequest requests from this least one SNMP manager device, and will transmit SNMP formatted response information related to the status of the network to this at least one SNMP manager device.

A network manager device, such as a SNMP manager device, may initiate network monitoring requests by sending the appropriate request packets to various destinations, including various switches, or directly to the monitoring gateway. If the network monitoring request is sent directly to a switch, the switch, typically lacking much intelligence, will have to forward the request to the appropriate monitoring gateway (this may be preset in that switch's flow-table, for example). The monitoring gateway in turn can process this request, and respond by, for example, either sending the appropriate response back to the originating network manager (e.g. originating SNMP manager device), or alternatively send the appropriate response back to the switch, and the switch can in turn send the response back to the originating network manager. Other routes are also possible.

Thus for example, at least one of the various unique switches, with its unique network address, can be configured (often by appropriate flow-table matching and instruction commands, and often by the appropriate monitoring gateway) to match SNMP request (or other type) network packets addressed to it, and then to forward the SNMP network packets addressed to that switch to the least one monitoring gateway. This at least one monitoring gateway can in turn send back SNMP formatted response information (as network packets with headers addressed to the at least one SNMP manager device) back to the originating SNMP manager device. So here the switch bounces the network monitoring request over to the monitoring gateway, which then responds directly.

As another alternative, the monitoring gateway can be further configured to respond to SNMP GetRequest or GetNextRequest requests (or other requests in any format) that have been directly addressed to monitoring gateway from the at least one SNMP manager device. Here the monitoring gateway can transmit SNMP formatted response information (or other type response information) related to the status of the network, as monitoring gateway generated SNMP formatted response information network packets, that are directly addressed to the unique network address of the originating SNMP manager device(s). Thus here, there is no need for the switch to bounce SNMP requests over to the monitoring gateway, instead the SNMP manager talks to the monitoring gateway directly.

The monitoring gateway typically will on occasion have to do a fair amount of internal processing to answer such network status requests. To assist in this processing in the case where OpenFlow type switches are being monitored, the monitoring gateway will typically be configured to use an OpenFlow management information base (MIB) (or other data storage format). This OpenFlow MIB, for example, can comprise data of properties that direct the monitoring gateway in how to respond to various SNMP commands (e.g. SNMP GetRequest or GetNextRequest commands) with appropriate SNMP responses that return information related to the status of the network. As an example, an OpenFlow MIB is shown in provisional application 61/942,000, the entire contents of which are incorporated herein by reference. In the case where other types of devices are being monitored according to other types of monitoring protocols, then alternative type MIB or other data storage formats may be used. Here for specificity, the OpenFlow standard discussed herein will be considered to be according to the OpenFlow 1.0 specification or higher.

As previously discussed, in some embodiments the flow-table controlled packet forwarding switch may be hardware configured to perform line-speed network packet forwarding by a process of automatically comparing incoming packet headers to flow-table packet header filters. Such configurations are very fast (e.g. able to handle billions of packets per second or higher), but otherwise often have very limited processing capability.

In order to accumulate enough information to satisfy various types of network status requests, the monitoring gateway will often need to monitor various aspects of switch or other managed device performance. In some embodiments, using flow-table type switches (again such as OpenFlow switches) as an example, the flow-table of at least one of the switches can be configured (by the monitoring gateway or other device/method) to additionally forward some or all packets where no match is found to the monitoring gateway. Note that a packet where no match is found may thus be sent both to the controller (such as the OpenFlow controller) to decide what to do with the exception, as well as to the invention's monitoring device (for purposes of monitoring network performance). Of course in some embodiments, the same device may act both as a controller and as the invention's monitoring device. The invention's monitoring gateway can then be used to record information (in the monitoring gateways memory) pertaining to the some or all these packets where the switch did not find a match. Here various types of information can be stored, such as a count of the matching or non-matching packets received on each switch port or virtual LAN, counts addressed to or from various network or datalink addresses, or counts of each of various protocol types, and the like.

Again using a subset of SNMP commands as a specific example, the monitoring gateway can be further configured to receive SNMP GetRequest or GetNextRequest requests either directly or indirectly addressed to it from at least one SNMP manager device. The monitoring gateway can then transmit SNMP formatted (or other type format for non SNMP applications) response information related to the status of the network as at least partially determined by results obtained from these previously discussed counts to the at least one SNMP manager device.

In another embodiment, the monitoring gateway may operate by repeatedly receiving exchanged network data packets (e.g. network packets that are exchanged between the switch controller and the flow-table controlled switch), and/or a statistical summary of these exchanged network packets. The monitoring gateway can receive this information by various methods, including commanding the switch's flow table to also copy these network data packets to the monitoring gateway, or by receiving any summaries of this information as are within the capability of the switch to deliver according to the switch's standard construction. The monitoring gateway then stores this information in its memory.

In this embodiment (again using some specific SNMP commands as a specific example), the monitoring gateway is further configured to recognize at least some SNMP GetRequest or GetNextRequest commands. The gateway then uses information in its memory that pertains to the exchanged network data packets and/or statistical summary of exchanged network data packets to respond to the SNMP GetRequest or GetNextRequest commands with SNMP responses that return information related to the status of the network.

In another embodiment, the monitoring gateway may be further configured to inspect incoming network status requests (such as SNMP GetRequest or GetNextRequest requests) to determine which flow-table controlled switch that request is associated with (or directed to). The monitoring gateway can then use at least some information that the monitoring gateway has received from the flow-table controlled switch associated with the request to respond to the SNMP GetRequest or GetNextRequest commands with SNMP responses that return information related to the status of the network.

In another embodiment, the monitoring gateway may be configured so that when it receives an SNMP GetNextRequest command that references an SNMP object with an SNMP object type that references information related to the switches; the gateway can determine the object type referenced by the SNMP GetNextRequest command, and then perform steps such as determining if information related to all instances of that object type have been received into the monitoring gateway's memory, and if not, the monitoring gateway can perform whatever other operations are needed to further receive into its memory any additional information related to instances of that object type that have not been previously received into memory. Alternatively or additionally, the monitoring gateway can receive information related to all instances of that object type into the memory, and only fulfill that SNMP GetNextRequest command when all instances of the object type have been received into the gateway's memory.

In either case, the monitoring gateway can then use the information related to all instances of that object type to determine which is the next instance associated with that SNMP GetNextRequest command. The gateway can then use this next instance and at least some information related to all instances of that object type to respond to that SNMP GetNextRequest command (or equivalent command for non SNMP requests) with an SNMP response that returns next instance information related to the status of the network.

Figure 10:
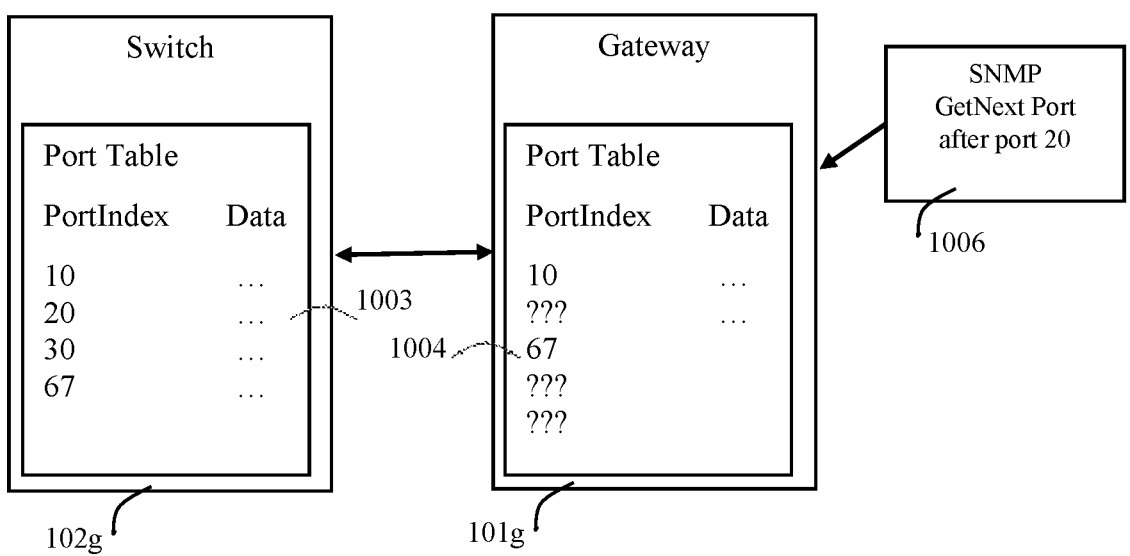
FIG. 10 shows how, using SNMP as an example, the invention's gateway can ensure correct processing of SNMP GetNext packets by ensuring that it (the gateway) has received all instances into memory that could possibly be referenced by the SNMP packet before satisfying the SNMP GetNext request.

For example, referring to FIG. 10, switch 102g has a port table 1003 containing four ports with index numbers 10, 20, 30 and 67. Gateway 101g has downloaded only a portion of the table or has not recently downloaded the whole table so portions of the table that are stored in the gateway's memory 1004 are no longer fresh or reliable. When gateway 101g receives an SNMP GetNext Packet 1006 requesting the next port after port 20, the gateway will not be sure of the correct answer to the query until it has downloaded the entire table and knows it has filled in any missing holes in the sorted table.

Virtual Monitoring Gateways

The invention's monitoring gateways can be implemented in either non-virtual (e.g. as fixed devices) or in a virtual configuration. Here it is useful to view the problem on a more general level.

At a more generalized level, the invention's monitoring gateway may be viewed as a type of server, and like all such modern servers, the gateway may exist in either real or virtualized (e.g. virtual elastic server) format. One advantage of employing virtualized gateways is that in a situation where a given gateway may be subject to an unusually high number of network status monitoring requests, standard virtual server techniques (e.g. AWS, Amazon Elastic Compute Cloud 2 (EC2), Apache CloudStack, Windows Azure, and the like) may be used to temporarily expand the number of monitoring gateways used to handle these requests, and this number of virtual servers then reduced again once no longer needed.

Figure 2:
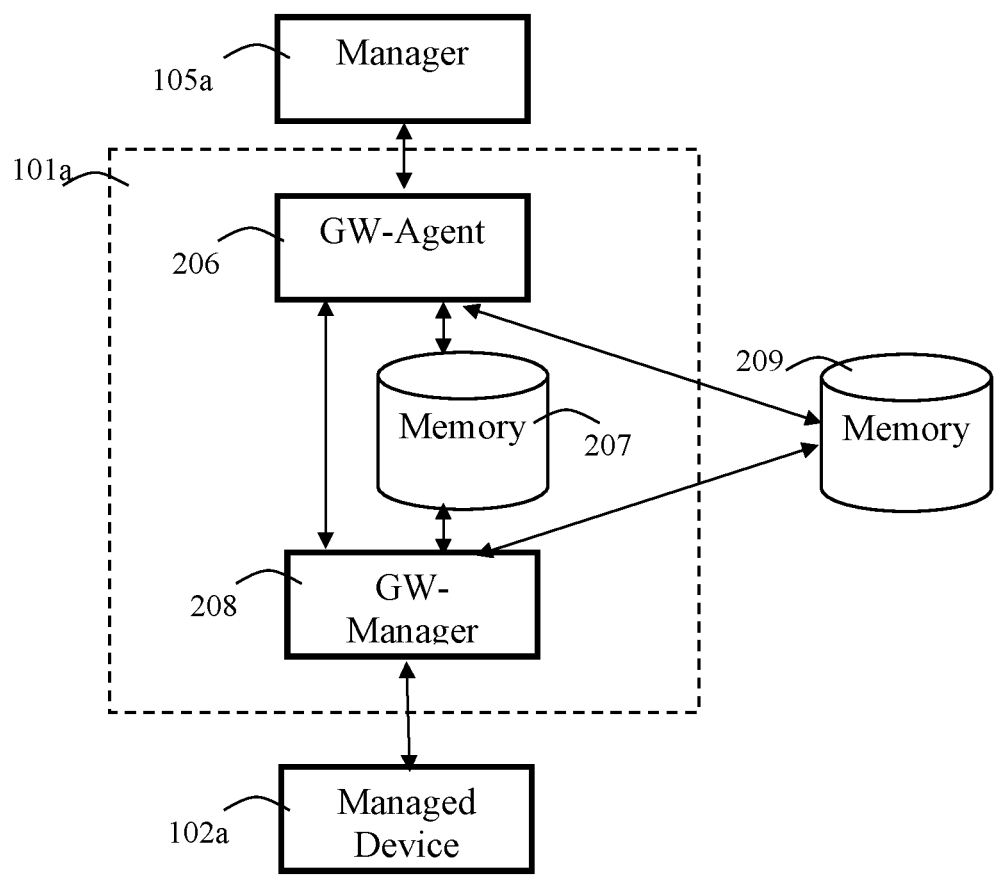
FIG. 2 shows one embodiment of some of the internal functions of the gateway.

FIG. 2 shows one embodiment of the invention's monitoring gateway 101a. GW-agent (Gateway agent) 206 can be management software that responds to network management requests. GW-manager 208 is management software that sends network management requests. Responsive to a request from manager 105a (e.g. legacy SNMP manager) for a specific piece of data related to managed device (switch) 102a, the GW-agent (Gateway agent) 206 will cause GW-manager 208 to send one or more requests to managed device 102a to retrieve data, optionally transform the data received into the form requested by manager 105a and then GW-agent 206 will transmit data in a response to manager 105a. Alternately, when GW-agent 206 receives a request from manager 105a, if that data has already been stored in some form in storage (e.g. memory) 207 (e.g. in memory or disk or some form of network storage) GW-agent 206 can transmit that stored data in a response to manager 105a and if it has not been stored it can cause GW-manager 208 to send one or more requests to managed device 102a to retrieve data to be sent to manager 105a. In another mode, the GW-manager 208 can send requests periodically to managed device 102a for the data and store the results so that fresh data is usually available in storage 207. In yet another mode, managed device 102a may transmit ("push" or "stream") data to GW-manager 208 when it deems necessary and GW-manager 208 may store the results and/or transmit them through GW-agent 206 to manager 105a. When GW-agent 206 receives a request from manager 105a, if it finds data in storage 207 that it deems to be out of date, the GW-agent 206 may choose not to transfer that stored data to the manager 105a but rather to initiate a new transfer via GW-manager 208 from managed device 102a. In any of these modes, data may be transformed into a new form before being stored in storage 207 or after being retrieved from storage, or upon being transferred directly from GW-manager 208 to GW-agent 206. In any of these modes, data may be communicated between the manager 105a and the gateway 101a that is unrelated to the managed device 102a or unrelated to management. In all cases involving storage 207, data may also be stored and retrieved at a remote network storage location, storage 209.

If manager 105a wishes to change some data or issue a command to managed device 102a, it may transfer the data or command to GW-agent 206 and then GW-manager 208 will transfer the data or command to managed device 102a.

If GW-manager 208 receives an event notification from managed device 102a or detects a condition in data received from managed device 102a, it may send an event notification to manager 105a.

GW-Agent 206 may receive requests from or send events to many managers (e.g. 105, 106, 107) and GW-manager 208 may transmit data to or from many managed devices (e.g. 102, 103, 104).

The protocol or protocols between the manager 105a and GW-agent 206 may be the same or may be different than the protocol or protocols between the GW-manager 208 and managed device 102a. Similarly, the GW-agent 206 may provide stronger (or weaker) authentication, access control and privacy services than managed device 102a.

If GW-agent 206 receives a request from manager 105a it is possible that the data requested is not available from managed device 102a or GW-manager 208 doesn't know how to make the proper request using any of the protocols supported by managed device 102a or that the data is available but requires a transformation that the GW-agent 206 doesn't know how to perform. In those cases, GW-agent 206 may return an error to manager 105a.

Typically gateway 101a may be implemented in a variety of ways including directly on standard computer processors (often an x86, MIPS, ARM, Power-PC or more specialized processor as desired), on dedicated network appliances or servers, or on one or more virtual machines. In the latter case where the gateway function is being virtualized, the implementation can scale dynamically based on the workload being experienced by the gateway. There are a variety of mechanisms for distributing the gateway amongst multiple physical or virtual machines including having multiple gateways each responsible for a different collection of managed devices (e.g. 102, 103, 104). Alternately, the gateway function itself may be distributed with the GW-agent 206 on a different machine or machines than the GW-manager 208. Because the workload per managed device may be different between the GW-agent 206 and the GW-manager 208, the number of managed devices assigned per machine may be different and thus the collection of managed devices assigned to each may be orthogonal. For example, GW-agent 206 may have 100 managed devices assigned per virtual instance and GW-manager 208 may have 200 managed devices assigned per virtual instance.

If the gateway is providing services for more than one managed device, as it receives requests from managers it will need to determine which managed device the request is referring to since it cannot infer the managed device from the destination address (the destination address will be of the gateway, not of one of the managed devices). With SNMP the identity of the managed device can be found by looking up the community string or context in a table or by algorithmically decoding them if the managed device identity was encoded. Other protocols may specify the managed device directly. With still others, the gateway may need to allocate a range of local ports or local network or datalink addresses and assign each one to one managed device. The gateway can then direct the request to the proper managed device based on one of those selectors.

Figure 3:
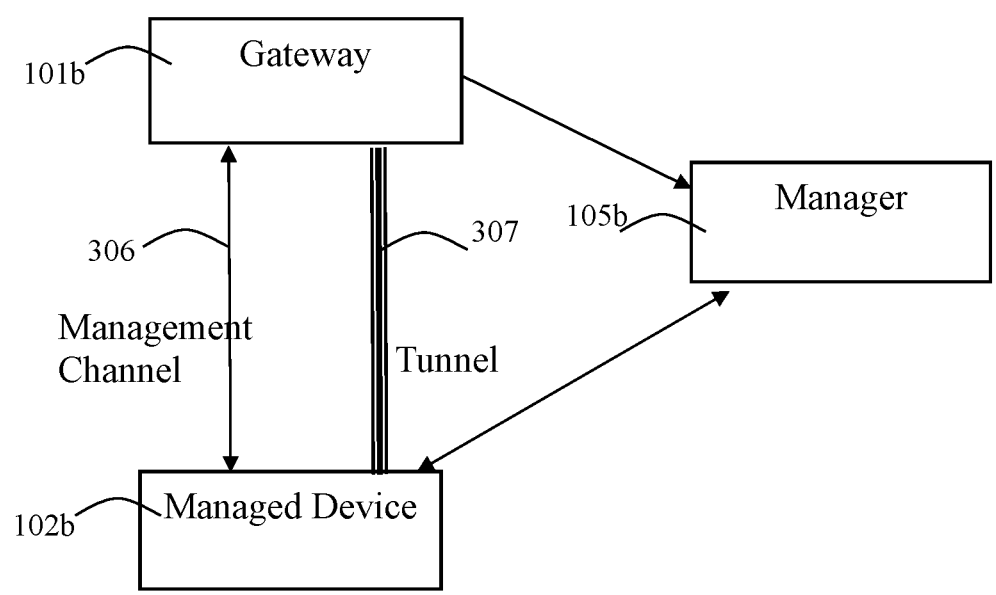
FIG. 3 shows an alternate embodiment where a manager (e.g. an SNMP manager) can communicate to the monitoring gateway at the managed device's (e.g. OpenFlow switches) network address and the managed device tunnels the traffic to and from the gateway.

Referring to FIG. 3, another embodiment is shown. Here the gateway 101b is the same entity marked elsewhere as 101 and 101a. The manager 105b and managed device 102b are the elements that wish to communicate and the gateway 101b is providing services for that communication. The management channel 306 is the network link represents the communications protocol the gateway uses above to transfer data to and from the managed device 102a. As it starts its service, the gateway may store its network address in the managed device 102b using the management channel. In this embodiment, the manager 105b sends its management packets (e.g. SNMP) to managed device 102b, just as it would if it was communicating to the managed device 102b without the services of the gateway. The managed device 102b identifies a packet as a management packet handled by the gateway 101b, encapsulates the packet and sends it in a tunnel whose endpoint is the gateway at a preconfigured address. When the gateway receives the tunnel-encapsulated packet, it decapsulates the packet, noting which tunnel it was received on. It then passes the packet to GW-agent 206 which knows which managed device the packet refers to by the destination address in the decapsulated packet. After the gateway has processed the packet and wishes to transmit data back to the manager in a response packet or packets, the gateway will encapsulate those packets into the tunnel it was received on or selected based on the destination address of the packet. Alternately the gateway may send the packet back directly to the manager 105b, possibly spoofing the source address of the GW-agent 206. If the packet was sent back to the managed device 102b on the tunnel, the managed device 102b will decapsulate the packet and send it to the manager 105b. Any tunneling protocol may be used including GRE, VXLAN, and L2TP as well as encapsulation into non-tunneling protocols. In order to meet the objective of communicating to the gateway 101b through the managed device 102b it is necessary that the packets to the gateway be sent to the gateway address and also include the manager 105b address and the managed device 102b address and that the packets from the gateway to the managed device be sent to the managed device 102b address and also include the manager 105b address as the next hop address. One of ordinary skill in the art will recognize that there are many ways to achieve this, including modification of the application protocol in use (e.g. SNMP, NetConf, HTTP, SSH).

When the managed device 102b receives the packet from the manager 105b, it may inspect the packet and if it has the capability to respond directly it may do so using local managed device resources or otherwise to tunnel it to the gateway.

Figure 4:
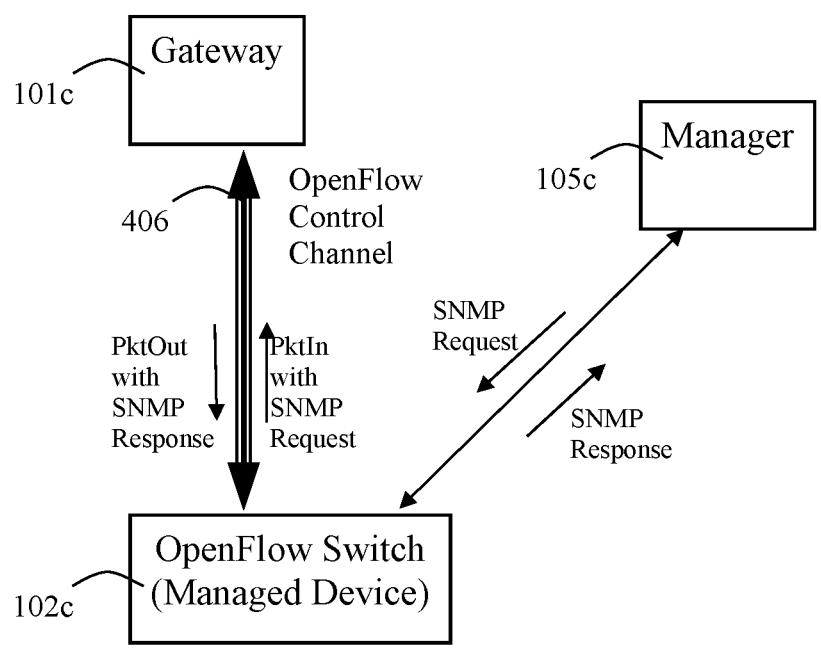
FIG. 4 shows an embodiment where the managed device is an OpenFlow switch and the network management function is virtualized on the gateway. The gateway receives information from the switch using the OpenFlow protocol. The manager communicates (for example sends SNMP requests) with the switch. The switch may likely lack enough internal computing capability to handle that particular communication (e.g. SNMP request), but it can be directed, using the OpenFlow protocol, to at least redirect this communication to the gateway for further processing.

Referring to FIG. 4, the OpenFlow embodiment is shown in more detail. The gateway 101c is the same entity marked elsewhere as 101 and 101a and 101b. The manager 105c and managed device 102c are the elements that wish to communicate and the gateway 101c is providing services for that communication. The managed device 102c is an element that implements the OpenFlow protocol. The management channel 406 is an OpenFlow channel between the gateway 101c and the managed device 102c. When the gateway 101c and managed device 102c establish a control channel between them the gateway will install a flow over the control channel as in FIG. 5. This flow will be set to match IP packets, to match all 32 bits of the IP Dst field with one of the switch's own IP addresses, to match the UDP protocol and to match the UDP destination port of 161. In most embodiments all other fields will be wildcarded. This example is one way of matching SNMP packets sent to the switch but the parameters can easily be modified or additional flows added to match other communication protocols. The gateway 101c will also begin periodically sending OpenFlow commands to the managed device 102c requesting data from the switch such as OFPMP_PORT_STATS, OFPMP_FLOW, OFPMP_TABLE, and OFPMP_METER. As the managed device 102c sends replies to these commands the gateway 101c can store the data received so that it can be returned when requested by the manager 105c. When the manager 105c sends an SNMP or other protocol packet to the managed device 102c, the switch will follow the downloaded flow rule and encapsulate the packet into a packetIn message and send it to the gateway 101c which is a controller. The gateway can decapsulate the packet and process it, transferring information to or from the managed device 102c. When the response packet is generated, it is sent to the managed device 102c in an OpenFlow packetOut message which decapsulates the packet and forwards it to the manager 105c. The gateway can also log some or all of the data received and if the gateway notices interesting conditions in the data it can log them locally or remotely or send them in events to the manager 105c. If the gateway 101c receives requests from the manager 102c to write data to the switch it can translate them into the appropriate OpenFlow commands and send them on the control channel.

Instead of a flow that sends packets to the controller (i.e. the gateway) in packetIn messages, the gateway can add a flow that sends packets in a tunnel to the gateway and back. The gateway could configure the tunnel using OF-Config or could rely on CLI configuration or some out of band method. One of ordinary skill in the art will recognize that there are other ways to create and configure the tunnel. This mechanism can have the advantage of using the fast path on the switch and not interrupting the supervisor processor.

The gateway 101c can also establish an OF-Config connection with the OpenFlow switch so that it can provide gateway services for OF-Config information.

Figure 6:
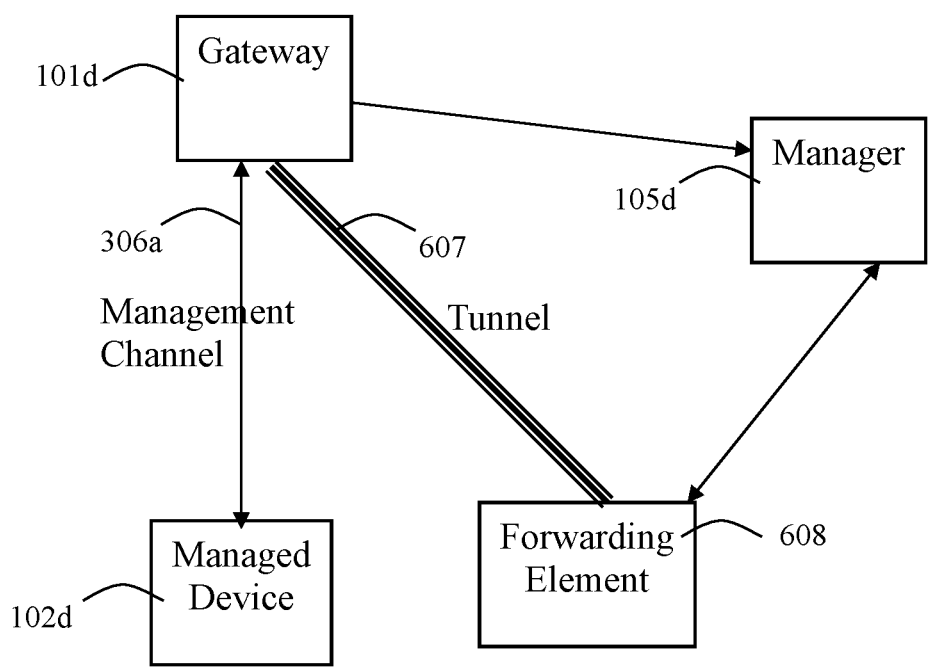
FIG. 6 shows an alternate embodiment where a manager, such as an SNMP manager, is sending traffic to the switch but a forwarding element is tunneling the traffic and sending it to the gateway to be processed and returned to the manager via the tunnel.
Figure 7:
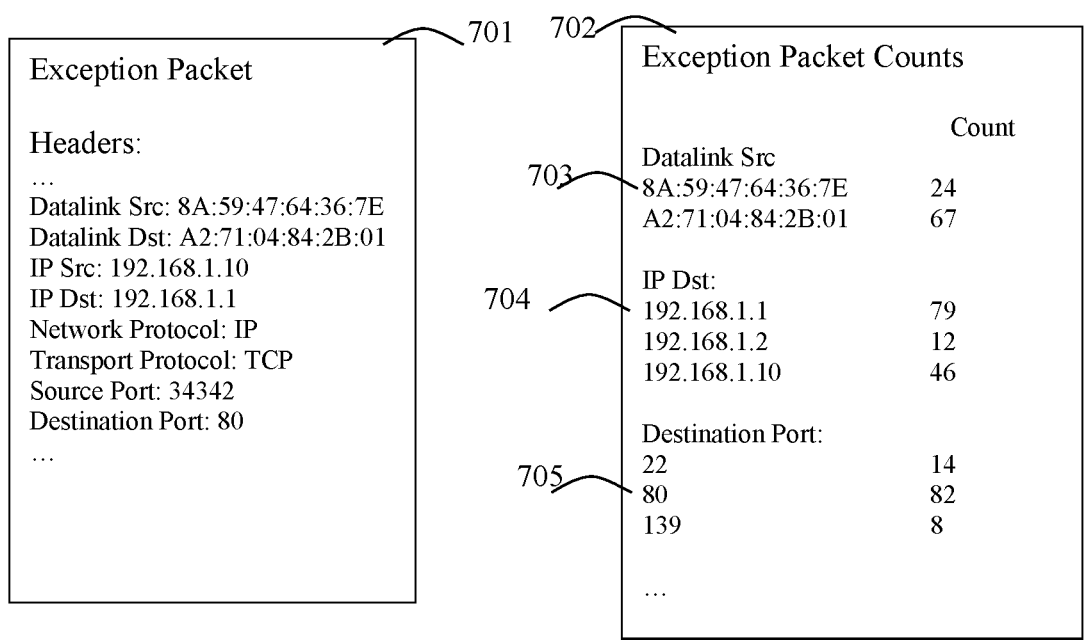
FIG. 7 shows one method of recording statistics (useful for flow-table controlled switches such as OpenFlow switches, and the like) by inspecting the header of exception packets that don't match any filters. Counts of the number of packets seen containing particular header values are stored and updated in memory (e.g. monitoring gateway memory) and made available to network managers.

Another embodiment is shown in FIG. 6. In this embodiment, a forwarding element (e.g. a switch or router) identifies a management packet from manager 105d to managed device 102d and encapsulates the packet and sends it in a tunnel 607 to gateway 101d where it is processed and can be returned to the manager 105d in the tunnel. This embodiment uses many of the mechanisms discussed earlier.

In other embodiments, the communications being redirected to the gateway is not management traffic and the gateway is providing services unrelated to a managed device.

Figure 8:
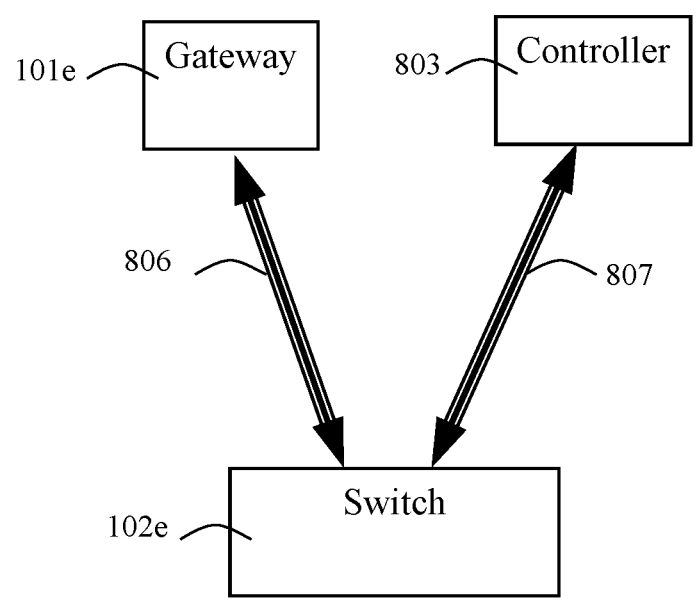
FIG. 8 shows an embodiment where the invention's monitoring gateway is communicating with the switch (e.g. OpenFlow switch) while a switch controller (which may be a prior-art type OpenFlow switch controller) is also communicating with the switch. In this embodiment, the gateway and switch controller are not sharing a control connection, nor are they running on the same computer system.

Referring to FIG. 8, while it's possible for the gateway 101e to be implemented on the same general purpose processor or server as the switch controller 803 and even to share the same control connection 806, there are benefits to separating these functions. Since monitoring and management packets between the gateway 101e and the switch 102e may be less time-sensitive than control packets between the switch 102e and the controller 803, it may be a benefit to have the monitoring packets on their own communications channel 806 so that it is less likely that they could delay the control packets. Further, implementing the gateway on a separate general purpose computer or server as the switch controller can help ensure that both functions perform well and scale well to large networks.

In some embodiments, switches can be configured to so that the communications channel 806 to the gateway 101e can be established in what's referred to as "active mode", where the switch 102e connects to the gateway 101e, or what's referred to as "passive mode", where the gateway 101e connects to the switch 102e. While the gateway of the present invention will work with switches in either mode, there may be benefits to "passive mode" because less configuration is required on the switch and because it affords more flexibility in moving the gateway without needing to reconfigure all the switches with which it communicates. When the gateway is communicating with the switch using an OpenFlow protocol the gateway can request a role it will assume in the communications. This role will control how the switch will act when there are multiple entities communicating with it using the OpenFlow protocol. There may be benefits for the gateway to choose the OFPCR_ROLE_EQUAL role and not to choose either of the OFPCR_ROLE_MASTER or OFPCR_ROLE_SLAVE roles.

Referring back to FIG. 2, a managed device 102a may send to GW-manager 208 a stream of incremental updates to one or more datasets on the managed device 102a to minimize the cost of keeping data up-to-date in the gateway. Further, the managed device 102a can keep records of conditions that have occurred in between polls by the GW-manager 208 and either make them available for polling or send them asynchronously (e.g. as events). For example, peak values of resource utilization or error conditions can be recorded and/or sent as events.

Figure 9:
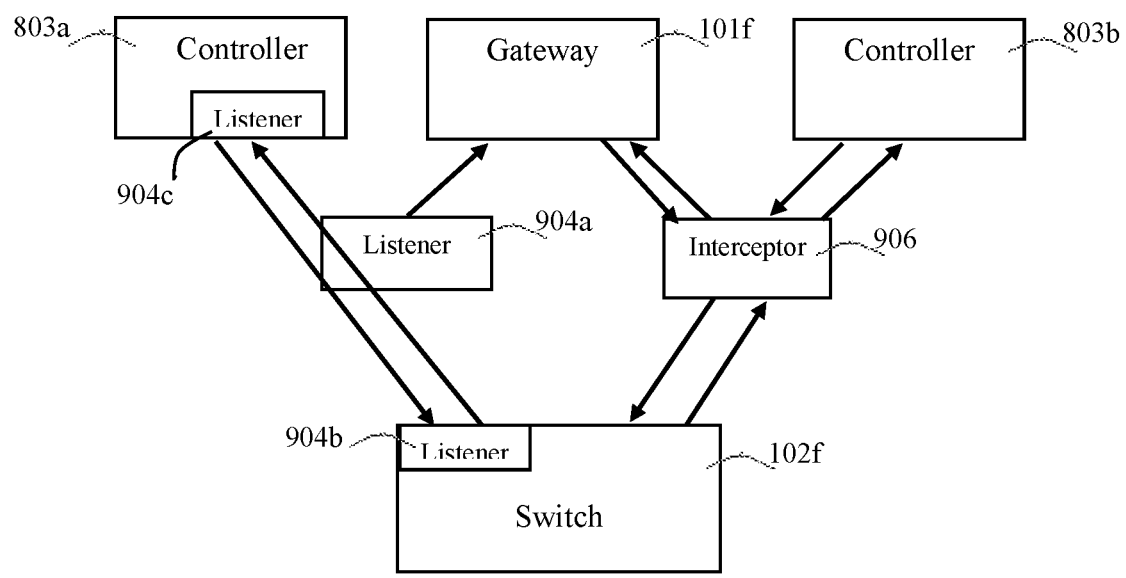
FIG. 9 shows an embodiment where the gateway can monitor control communications to and from the switch using either a listener or an interceptor.

Regarding a switch that is controlled by at least one switch controller, it may be advantageous in some circumstances for the gateway to receive information from or about the switch without adding a new connection to the switch. To accomplish this, the gateway needs the help of either a listener or an interceptor. Referring to FIG. 9, controller 803a is communicating switch 102f. A listener (904a, 904b, or 904c) receives network packets that are part of that communication and sends those packets or a statistical summary of those packets to the gateway 101f. The listener can be implemented on the switch (as in listener 904b), or on the controller (as in listener 904c), or in the network either wiretapping packets or on a network forwarding device (as in listener 904a). Again referring to FIG. 9, controller 803b wishes to communicate with switch 102f. The controller 803b is configured to communicate with interceptor 906 and interceptor 906 is configured to communicate with switch 102f. Any network packets from controller 803b intended for switch 102f are copied by interceptor 906 and sent to switch 102f. Any network packets from switch 102f intended for controller 803b are copied by interceptor 906 and sent to controller 803b. The interceptor 906 sends a copy of some or all network packets received, or a statistical summary thereof, to gateway 101f. The interceptor 906 can be configured to receive network packets from gateway 101f and send them to the switch 102f as if they had been sent from the controller 803b. The interceptor 906 can also be configured to receive instructions from gateway 101f as to network packets that should be sent to switch 102f, again as if they had been sent from the controller 803b. In either case the interceptor 906 sends a copy of some or all network packets received in response, or a statistical summary thereof, to gateway 101f and in most cases will not forward network packets received in response on to the controller 803b. As with the listener (904a, 904b, or 904c), the interceptor 906 can be implemented in various places on the network, for example on a device somewhere on the network, or on the controller 803b, the gateway 101f, or the switch 102f.

Other Embodiments

Additional embodiments of the invention are described in more detail in applicant's U.S. provisional application 62/118,433, "Monitoring and Managing Communications Networks", filed Feb. 19, 2015, the entire contents of which are incorporated herein by reference.

In some embodiments, regardless of if SNMP methods or alternative methods are employed, at least some of the various switches may be configured (e.g. by appropriate flow-table header filter and associated instructions) to recognize monitoring packets addressed to that switch. The switch may be further configured with instructions to forward these monitoring packets to at least one monitoring gateway. This at least one monitoring gateway can then be used to send response information as network packets with headers addressed to the at least one manager device.

As previously discussed, another problem that often exists with higher functionality network managed elements, such as routers and servers, is that even if that element's processing capability is, in theory, sophisticated enough to support network management protocols such as SNMP requests at a low speed or low volume, in practice such devices that may not have enough processing capacity to handle a higher volume of network management requests from one or more NMS's, while still performing its routine functions in a timely manner. That is, such devices may have to make an unhappy decision between either performing their basic network function, or responding to network monitoring requests, but can't do both functions well at the same time.

Although certain specific devices with limited computing capability, such as OpenFlow switches, have been used throughout this disclosure as specific examples, it should be evident that the methods disclosed herein can also be used to reduce the burden of servicing an overlarge number of network monitoring requests on more capable or higher functionality network managed elements. Thus in a more generalized version of the invention, these techniques can be used to help assist nearly any type of network element where the network functionality of the element is limited when the element it is being subjected to an overlarge number of network monitoring requests. This is because nearly any network managed element that is being overloaded by network management monitoring requests can divert or request diversion of these requests to the invention's monitoring gateways, and thus reduce the impact of the overload.

In alternative embodiments, the managed device may be a software-created managed device, such as a server instance. This type of software-created managed device can be created by suitable software that is executed by one or more processors on a server. Using this example of a server instance, the monitoring gateway will receive monitoring data about the server instance at least once and can thereafter respond to network information requests from manager devices that seek information about the server instance. The manager devices are thus able to learn information about the server instance (e.g. its status) even if the server instance is suspended or has been terminated. This is helpful in a virtualized environment where there may be many server instances and/or where individual server instances may have only short lifetimes.

While various embodiments have been described with reference to examples and specific details, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods maybe performed in different orders than illustrated or simultaneously. Those skilled in the art will recognize that these and other variations are possible within the spirit and scope of this description.

The invention claimed is:

1. A method of monitoring a status of real or virtual managed devices located in a network, said network further comprising at least one manager device;
    said method comprising:
    providing at least one monitoring gateway, different from said managed devices, comprising a processor, memory, and software, each said monitoring gateway having a unique network gateway address and configured to receive monitoring data of a plurality of said managed devices, and to store at least some information pertaining to said monitoring data in said memory;
    each said monitoring gateway further configured to recognize at least some network monitoring commands, and to use said at least some information to respond to said-network monitoring commands with responses that return information related to the status of said managed devices; and
    each said monitoring gateway further configured to respond to network information requests from said at least one manager device and to transmit response information related to the status of said managed device to said at least one manager device.

2. The method of claim 1, wherein said managed device is a running instance of software.

3. The method of claim 2, wherein said running instance of software is running in a virtual machine.

4. A monitoring gateway device for monitoring a status of real or virtual managed devices located in a network, said network further comprising at least one manager device;
  said monitoring gateway device comprising a processor, memory, and software, said monitoring gateway device having a unique network gateway address and configured to receive monitoring data of a plurality of said managed devices, and to store at least some information pertaining to said monitoring data in said memory;
  wherein said monitoring gateway device is different from said managed devices;
  said monitoring gateway device further configured to recognize at least some network monitoring commands, and to use said at least some information to respond to said network monitoring commands with responses that return information related to the status of said managed devices; and
  said monitoring gateway device further configured to respond to network information requests from said at least one manager device and to transmit response information related to the status of said managed devices to said at least one manager device.

5. The device of claim 4, wherein said managed device is a running instance of software.

6. The device of claim 5, wherein said running instance of software is running in a virtual machine.

7. A method of monitoring a status of at least one instance of running software, said method comprising:
  a network configured to forward network packets, each said network packet comprising a packet header and packet payload, said network comprising at least one instance of managed devices comprising said running software, and at least one manager device;
  each said at least one instance of running software being associated with a unique network address;
  said method comprising:
  providing at least one monitoring gateway, different from said managed devices, comprising a processor, memory, and software, each said at least one monitoring gateway having a unique network gateway address and configured to repeatedly receive monitoring data from said at least one instance of running software, and to store at least some information pertaining to said monitoring data in said memory;
  each said at least one instance of running software further configured to recognize network monitoring packets addressed to a unique network address associated with said at least one instance of running software, said network monitoring packets containing monitoring commands, and to forward said network monitoring packets to said at least one monitoring gateway; and
  using said at least one monitoring gateway to send response information about said at least one instance of running software as network packets.

8. The method of claim 7, further using said at least one monitoring gateway to send response information about said at least one instance of running software as network packets with headers addressed to said at least one manager device.

9. The method of claim 1, wherein at least some of said managed devices are virtual managed devices, and at least some said managed devices are any of suspended and terminated.

10. The method of claim 1, wherein said memory used by said monitoring gateway is different from any memory used by said managed devices.

11. The method of claim 10, wherein said managed device is a software-created managed device, said software-created managed device has been terminated, thereby becoming a terminated software-created managed device, and said response information comprises information on a status of said terminated software-created managed device.

12. The method of claim 1, wherein said processor used by said monitoring gateway is different from any processor used by said managed devices.

13. The device of claim 4, wherein at least some of said managed devices are virtual managed devices, and at least some said managed devices are any of suspended and terminated.

14. The device of claim 4, wherein said memory used by said monitoring gateway is different from any memory used by said managed devices.

15. The device of claim 14, wherein said managed device is a software-created managed device, said software-created managed device has been terminated, thereby becoming a terminated software-created managed device, and said response information comprises information on a status of said terminated software-created managed device.

16. The device of claim 4, wherein said processor used by said monitoring gateway is different from any processor used by said managed devices.

17. The method of claim 7, wherein at least some of said managed devices are virtual managed devices, and at least some said managed devices are any of suspended and terminated.

18. The method of claim 7, wherein said memory used by said monitoring gateway is different from any memory used by said managed devices.

19. The method of claim 18, wherein said managed device is a software-created managed device, said software-created managed device has been terminated, thereby becoming a terminated software-created managed device, and said response information comprises information on a status of said terminated software-created managed device.

20. The method of claim 7, wherein said processor used by said monitoring gateway is different from any processor used by said managed devices.

* * * * *